United States Patent

Kawada et al.

[11] Patent Number: 4,543,506
[45] Date of Patent: Sep. 24, 1985

[54] PERMANANT MAGNET FIELD TYPE ROTOR STRUCTURE FOR AN ELECTRIC MACHINE

[75] Inventors: Shigeki Kawada, Hino; Yoichi Amemiya; Masatoyo Sogabe, both of Hachioji, all of Japan

[73] Assignee: Fanuc Ltd., Tokyo, Japan

[21] Appl. No.: 702,428

[22] Filed: Feb. 19, 1985

Related U.S. Application Data

[63] Continuation of Ser. No. 534,886, Sep. 22, 1983, abandoned.

[30] Foreign Application Priority Data

Sep. 27, 1982 [JP] Japan ................................ 57-166697

[51] Int. Cl.$^4$ ............................................. H02K 21/12
[52] U.S. Cl. ...................................... 310/156; 310/42; 310/261
[58] Field of Search ...................... 310/156, 42, 43, 45, 310/261, 216–218

[56] References Cited

U.S. PATENT DOCUMENTS

| | | | |
|---|---|---|---|
| 2,192,985 | 3/1940 | Reis | 310/156 |
| 2,255,477 | 9/1941 | Tognola | 310/156 |
| 3,012,161 | 12/1961 | Puder | 310/156 |
| 3,072,813 | 1/1963 | Reijnst et al. | 310/156 |
| 3,169,203 | 2/1965 | Lavin et al. | 310/156 |
| 3,221,194 | 11/1965 | Blackburn | 310/156 |
| 3,320,454 | 5/1967 | Kober | 310/156 X |
| 3,671,788 | 6/1972 | Knudson et al. | 310/156 |
| 3,979,821 | 9/1976 | Noodleman | 310/156 X |
| 4,127,786 | 11/1978 | Volkrodt | 310/156 |

FOREIGN PATENT DOCUMENTS

| | | |
|---|---|---|
| 2499326 | 2/1981 | France . |
| 56-19369 | 5/1981 | Japan . |
| 2075274 | 5/1980 | United Kingdom . |

OTHER PUBLICATIONS

"Fundamentals and Application of Small-Sized Precise Motor", published in Japan in 1977, pp. 128–131.

Primary Examiner—Mark O. Budd
Attorney, Agent, or Firm—Armstrong, Nikaido, Marmelstein & Kubovcik

[57] ABSTRACT

A rotor structure comprising a shaft and a magnetic pole assembly comprising radially disposed permanent magnets and yokes. The magnetic pole assembly is supported by the shaft through end plates. The end plate has a recess to receive the end of the magnetic pole assembly. The magnetic pole assembly can be fit into the end plates.

9 Claims, 5 Drawing Figures

PERMANANT MAGNET FIELD TYPE ROTOR STRUCTURE FOR AN ELECTRIC MACHINE

This application is a continuation of application Ser. No. 534,886, filed Sept. 22, 1983, now abandoned.

BACKGROUND OF THE INVENTION

1. Field of the Invention

The present invention relates to an electric machine, and more particularly to a permanent magnet field type rotor structure for an electric machine.

2. Description of the Prior Art

Permanent magnet field type rotors are often used in relatively small electric synchronous motors or the like. Such rotors must have a compact structure. To satisfy this requirement, design of and interconnections between the rotor components must be simple.

SUMMARY OF THE INVENTION

To achieve the above-mentioned requirement, there is provided, according to the present invention, a permanent magnet field type rotor structure for an electric machine, comprising a shaft; a pair of axially spaced end plates which are secured to the shaft and have respective facing inner walls, each of the inner walls having a recess; a plurality of permanent magnets each extending radially outward from the shaft and extending axially between the end plates; and a plurality of yokes each arranged between the adjacent magnets and extending axially between the end plates for supporting the magnets, the yokes at each end thereof being received by the recess in the inner wall of the respective end plate.

BRIEF DESCRIPTION OF THE DRAWINGS

The invention will be more fully understood from the following description of the preferred embodiments of the invention in connection with the attached drawings, in which.

DESCRIPTION OF THE PREFERRED EMBODIMENTS

Figure 1:
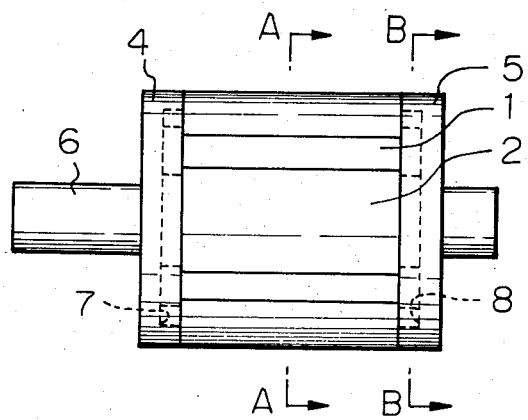
FIG. 1 is a front view of a permanent magnet field type rotor according to the invention.
Figure 2:
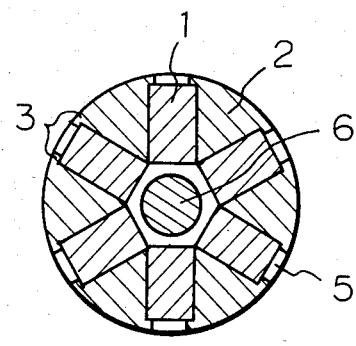
FIG. 2 is a section of the rotor taken along line A—A of FIG. 1.
Figure 3:
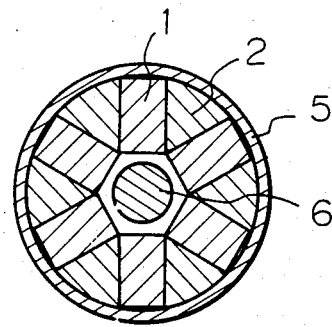
FIG. 3 is a section of the rotor taken along line B—B of FIG. 1.

Referring to FIGS. 1 to 3, a permanent magnet filled type rotor according to the present invention comprises permanent magnets 1, yokes 2, spaced end plates 4 and 5, and a shaft 6. The magnets 1 and the yokes 2 extend radially outward from the shaft 6 in alternation. The yokes 2, as is well known, support the magnets 1 and define pole surfaces which project outwardly from the outer surfaces of the magnets. Pole shoes 3 extending from either outward edge of the yokes 2 along their entire lengths overlap the outer surfaces of the magnets 1, each of which is rectangular in cross-section. The magnets 1 and yokes 2 come into contact with each other. The apex of each yokes 2 meets the inside corners of the adjacent magnets 1. Th magnets 1 and the yokes 2 define a magnetic pole assembly. The outer surfaces of the yokes 2 define the intermittent cylindrical outer surface of the pole assembly. The pole assembly extends axially and can be supported as a unit by the end plates 4 and 5.

The end plates 4 and 5 can be inserted over the shaft 1 and secured thereonto in a known manner. The end plates 4 and 5 have cylindrical recesses 7 and 8 on their respective facing inner walls. These recesses 7 and 8 receive the opposite ends of the yokes 2 to support the pole assembly. As shown in FIG. 3, the outer surfaces of the yokes 2 narrow at each radial end, as viewed in cross-section, at which point they meet the outside corners of the adjacent magnet 1. The pole assembly comprising the magnets 1 and the yokes 2 can thus be fit to the end plates 4 and 5 such as to leave the outside surfaces of the pole assembly smoothly continues with the end plate. It will be appreciated that this fit between the pole assembly and the end plates 4 not only enables the end plates to support the pole assembly but also holds the components of the pole assembly together. When fitted, the yokes 2 frictionally contact the magnets 1; the pole shoes 3 prevent the magnets 1 from moving outwards.

The pole assembly comprising the magnets 1 and the yokes 2 can be impregnated with an adhesive solution and dried prior to inserting the assembly over the shaft 6. This also aids the securing of the magnets to the yokes 2. In addition, elastic insertions may be interposed between the shaft 6 and the inner surfaces of the magnets 1 to prevent the magnets from moving inwards. Press fitting is desirable as the method of fitting.

Figure 4:
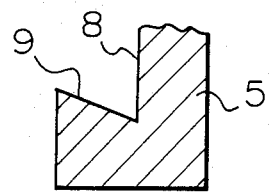
FIG. 4 is a partial, enlarged view of a modified end plate.

To ensure th unity of the structure by fitting, the cylindrical inner wall of the recess 8 in the end plate 5 can be tapered, as shown in FIG. 4. If the end plate 5 is made of an elastic material, the elastic force will ensure the interconnection. If the end plate 5 is non-elastic, the tapered end of the end plate 5 will undergo plastic deformation during driving of the end plate over the pole assembly, thus strengthening the interconnection. Although the end plate 5 is only shown tapered, it will be clear that such a taper can be provided to the other end plate 4 as well as the pole assembly.

Figure 5:
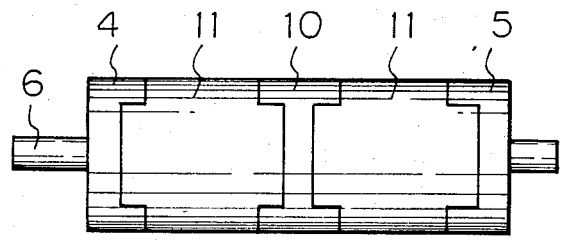
FIG. 5 is a schematic view of a rotor of another embodiment of the invention.

FIG. 5 shows another embodiment of the invention, wherein an intermediate end plate 10 is interposed between two magnetic pole assemblies, each of which is constructed in the manner previously described. The intermediate end plate 10 has recesses and is fitted to the pole assemblies 11 on both sides thereof. This structure is particularly advantageous when the rotor is elongate and the intermediate portion of the pole assembly is free to expand outward due to centrifugal force. Such expansion can be prevented by the rigid intermediate plate 10. The cylindrical inner wall of the recess in the intermediate plate 10 may also be tapered.

It is to be noted that the present invention greatly facilitates assembly and provides a compact rotor structure.

We claim:

1. A permanent magnet field type rotor structure for an electric machine comprising:
   a shaft;
   a pair of axially spaced end plates which are secured to the shaft and have respective facing inner walls, each of said inner walls having a recess;
   a plurality of permanent magnets each extending radially outward from the shaft and extending axially from end plate to end plate; and
   a plurality of yokes arranged between adjacent magnets and extending axially between the end plates for supporting the magnets, the yokes at each end thereof being received by the recess in the inner wall of the respective end plate and wherein the outer surfaces of the yokes define an intermittent cylindrical outer surface, which is tapered so as to have a smaller diameter at each end than in the middle, and the recess of each of the inner walls of the end plate is cylindrically shaped such that the yokes are press-fit into the end plates, the outer surfaces of the yokes tapering at each end therefore to be fit essentially flush with said magnets, and said yokes overlapping a part of the exposed surfaces of said permanent magnets between said end plates.

2. A rotor structure according to claim 1, wherein the magnets and the yokes define an assembly which is treated by an impregnation.

3. A rotor structure according to claim 1, wherein an insertion is arranged between each of the magnets and the shaft.

4. A rotor structure according to claim 3, wherein said insertion is elastic.

5. A rotor structure according to claim 1, wherein each of the magnets is rectangular in cross-section and each of the yokes is a radial segment is cross-section.

6. A rotor structure according to claim 5, wherein the outer surfaces of the yokes narrow at each radial end, as viewed in cross-section, at which point they meet the ouside corners of the adjacent rectangular magnets.

7. A rotor structure according to claim 5 wherein the inside apex of the yokes meets the inside corners of the adjacent rectangular magnets.

8. A rotor structure according to claim 1, wherein at least one of the fitting surfaces of the yokes and the end plates are tapered so as to strengthen the interconnection.

9. A rotor structure according to claim 1, wherein at least one additional pole assembly comprising the magnets and the yokes is supported by the shaft in series, the inside ends of the pole assemblies being interconnected through an intermediate end plate which has recesses on either surface for fitting.

* * * * *